OR 3,312,900

X 5397W
X 5824N

April 4, 1967 — D. L. JAFFE — 3,312,900

TELEVISION AUDIENCE SURVEY SYSTEM

Filed March 31, 1964 — 2 Sheets-Sheet 1

INVENTOR.
D. LAWRENCE JAFFE
BY Darby and Darby
ATTORNEYS

INVENTOR
D. LAWRENCE JAFFE
BY Darby & Darby
ATTORNEYS 3,312,900

TELEVISION AUDIENCE SURVEY SYSTEM

David Lawrence Jaffe, Great Neck, N.Y., assignor to Polarad Electronics Corporation, Long Island City, N.Y., a corporation of New York Filed Mar. 31, 1964, Ser. No. 356,202
10 Claims. (Cl. 325—31)

This invention relates to apparatus for determining the channels to which an operating television receiver is tuned by receiving the local oscillator signal radiated from a receiver and more particularly to a system for identifying a received local oscillator signal as originating from a television receiver by the presence of modulation information produced by the receiver's line scanning signal generating circuits.

In taking audience surveys of television program listening it is sometimes desirable to determine the number of individual receivers tuned to a particular channel within a given area. One system for doing this, illustrated in Fremont et al. Patent 2,896,070, involves the reception of the local oscillator signal generated by each individual receiver after it is radiated into space. This local oscillator signal is produced in each receiver to heterodyne with the received television signal to produce an intermediate frequency used in the receiver for producing the video and sound information. Radiation of the local oscillator signal usually occurs in a receiver due to the construction and location of the local oscillator circuits.

Due to the fixed frequency requirements imposed by the Federal Communication Commission for the video carrier of the television signal and the intermediate frequency for the receivers generally adopted by the industry, the local oscillator frequencies of the majority of television receivers tuned to the same channel would be substantially the same. Of course, the exact frequencies of the local oscillators of individual receivers are subject to a group of independent variables such as manufacturers tolerances on alignment of receivers, "fine tuning" of the receiver by the listener, instability of oscillator tuned circuits, etc.

In practice, the local oscillator radiations from individual receivers tuned to the same channel would vary over approximately two megacycles. The distribution of the individual radiated local oscillator signals over this frequency range, which approaches a random distribution curve, gives rise to the capability of detecting the operation of each of these receivers by receiving its radiated local oscillator signal. With present day equipment having the ability to resolve signals to within 100 c.p.s., as many as 20,000 counts of receivers operating in the 2 megacycle range can be obtained.

A major problem, which results in potential inaccuracies of the count, in audience survey systems of the type being described, is that caused by signals of the same frequency as the television receiver local oscillator radiations which are radiated by sources other than television receivers. For example, the local oscillator frequency of a television receiver tuned to channel 2 is approximately 101 megacycles. This corresponds to the local oscillator frequency of a conventional frequency modulated (FM) reciver with 10.7 mc. intermediate frequency which is tuned to 90.3 mc. If the uncertainty of tuning the television receiver is $\pm\Delta f$ mc. the FM receiver's radiated local oscillator energy could be received by a monitoring unit if its frequency were $90.3\pm\Delta f$ mc. Thus, an erroneous count of an operating FM receiver would be included in the survey of operating television signals. Of course, the potential source of error should be eliminated to improve the accuracy of the count.

Radio communication services, such as air navigation, air communication, amateur and government, etc. which operate in the 100 mc. to 257 mc. range are also potential sources of erroneous signals. These services utilize and radiate signals in the range of the local oscillator frequencies of the television receivers and therefore contribute to the uncertainty in a survey system which uses the reception of local oscillator signal radiations.

The present invention is directed to a system for surveying the number of operating television receivers tuned to a particular television channel which eliminates the problem of erroneous counts caused by reception of local oscillator radiations from receivers other than television receivers and of other spurious signals.

It has been discovered that the radiated local oscillator signal of each television receiver is modulated either in amplitude or frequency, or both, by the horizontal line frequency energy of the receiver. According to presently adopted standards, this line frequency is 15,750 c.p.s. This modulation ocurs due to a high level of the horizontal line scanning frequency energy being present in the television receiver chassis which develops voltages in circuits, wires, or other components that have an impedance at 15,750 c.p.s. These circuits include the local oscillator and other circuits where the local oscillator signal is present. Thus, the radiated local oscillator signal is modulated by a frequency corresponding to the line scanning rate.

By using suitable circuits at a monitoring unit which receives the radiated local oscillator signals to detect the presence of the line scanning moduation, a received local oscillator signal may be uniquely identified as originating from a television receiver rather than from some other source. This eliminates any errors or uncertainties in the final count resulting from signals of the correct frequency received from sources other than a televison receiver.

In a preferred embodiment of the invention, the circuits for detecting the presence of the line scanning energy modulation on the radiated local oscillator signal are synchronized in frequency with the main power source, a stable oscillator operating at the line scanning frequency, or the line scanning frequency signals of the same channel being surveyed as derived from another television receiver tuned to that channel. Since the line scanning energy of a television receiver is alo synchronized to this same frequency, an easy method for identifying the received local oscillator signal as originating from a television receiver is available.

It is therefore an object of the present invention to provide a system for surveying the number of receivers tuned to a particular frequency by receiving the local oscillator signals radiated from the receivers and uniquely identifying the receivers as being television receivers by the presence of modulation at the line scanning rate of the receiver.

Other objects and advantages of the present invention will become more apparent upon reference to the following specification and annexed drawings in which.

Figure 4:
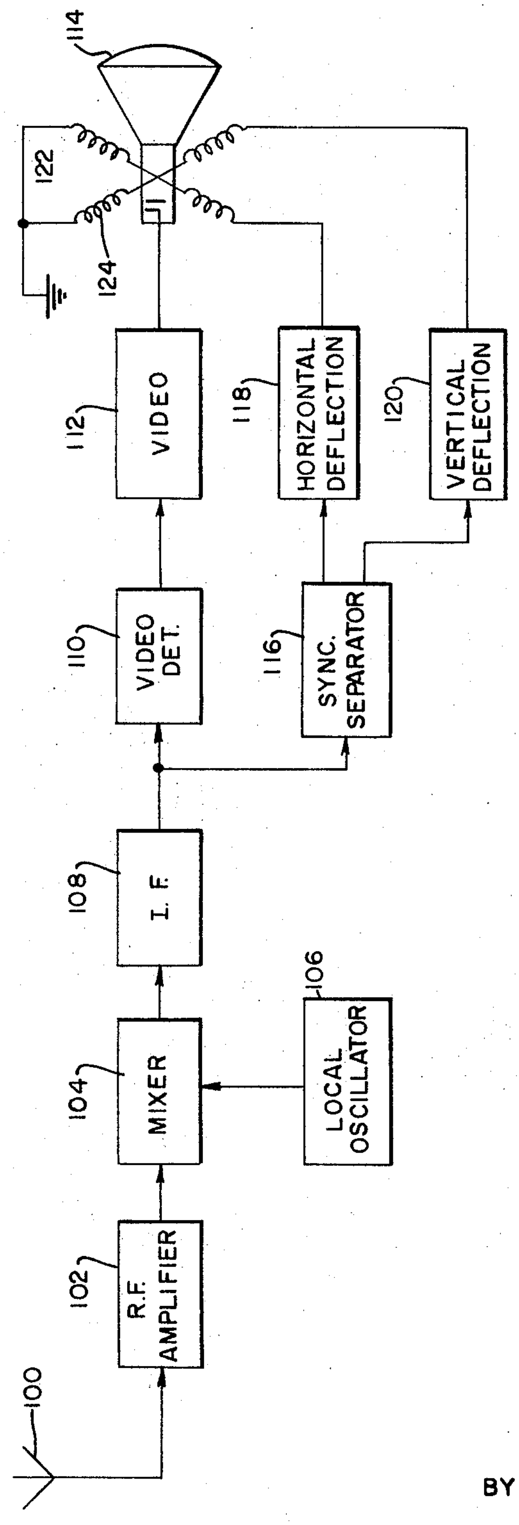

FIG. 4 shows portions of a conventional television receiver having an antenna 100 coupled to an RF amplifier 102 which in turn supplies the amplified received signal to one input of a mixer 104. The mixer 104 also receives another input signal from a local oscillator 106 and operates to produce an intermediate frequency signal (IF) which is amplified by one or more IF amplifier stages 108

The video information is demodulated from the IF signal by a video detector 110 and this information is amplified by a video amplifier 112 whose output drives the grid or cathode of a cathode ray tube 114.

The horizontal and vertical synchronizing signals are separated from the video signal, before, at or after the video detector by a sync separator circuit 116. These signals synchronize the respective horizontal and vertical deflection circuits 118 and 120 of the receiver. Each deflection circuit 118 and 120 drives a corresponding deflection coil 122 and 124. Operation of all of the foregoing circuits is conventional.

As described above, the local oscillator 106 normally radiates its signal for a considerable distance. I have found that this signal is modulated with information from the receiver's deflection circuits. More specifically, I have found that the high level of line scanning energy present in the receiver, in the deflection coils, horizontal output transformer and/or the horizontal oscillator modulates this radiated signal either amplitude and/or frequency wise. This modulation occurs because the scanning energy, which also is radiated, is normally not completely shielded from the local oscillator.

Figures 1, 2, 3:
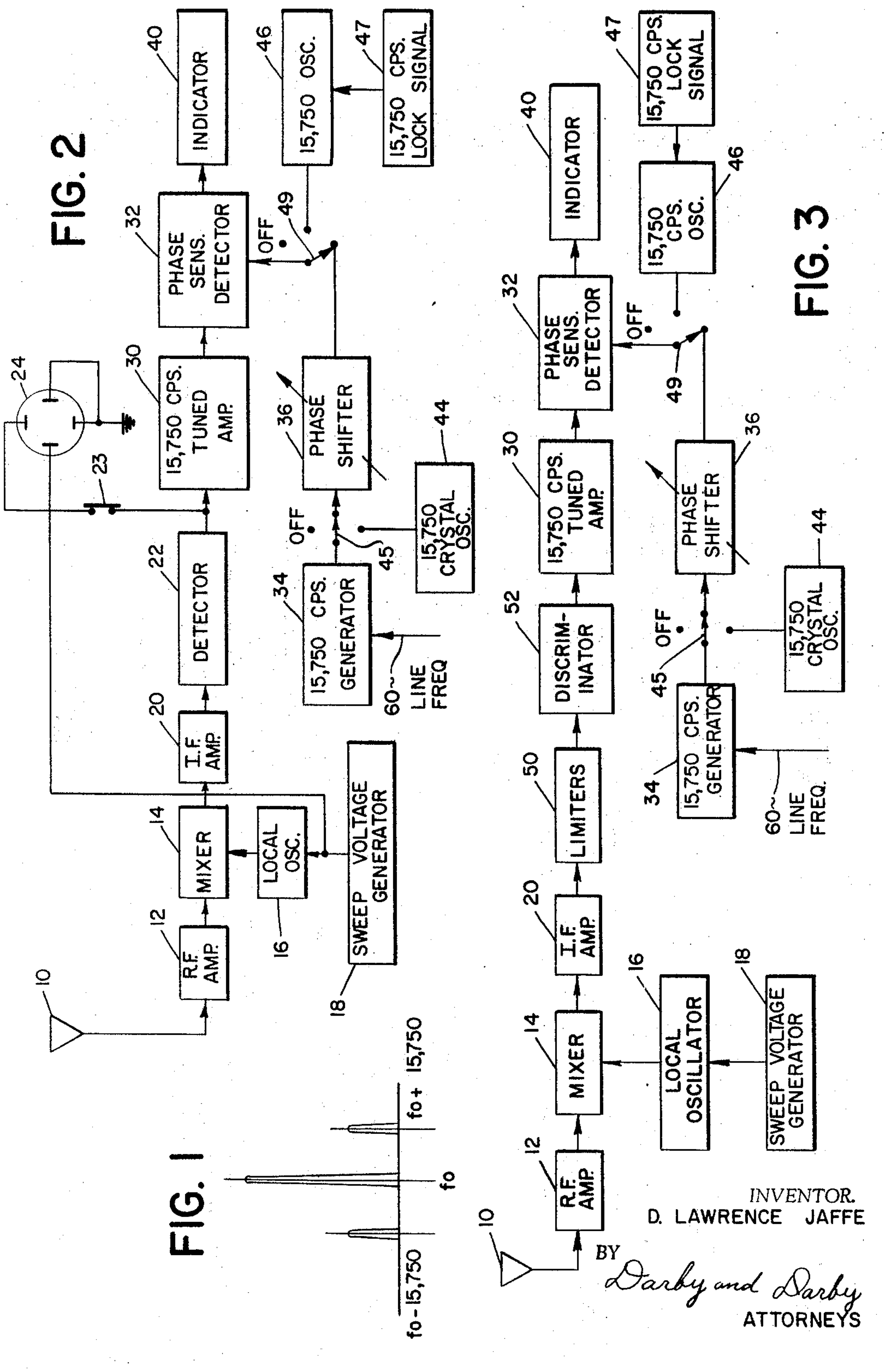
FIGURE 1 shows the signal radiated by a television receiver.
FIGURE 2 is a schematic block diagram of a system used to identify the source of a received radiated signal where the line scanning energy amplitude modulates the local oscillator signal.
FIGURE 3 is a schematic block diagram of a system for identifying television receivers wherein the radiated local oscillator signal is frequency modulated by the line scanning energy.

FIGURE 1 illustrates the type of signal radiated by the local oscillator of an operating television receiver. The radiated signal comprises a peak component of a frequency $f_o$, which is the frequency to which the local oscillator of the operating receiver is tuned. This frequency is spaced from the video carrier frequency of the television channel to which the receiver is tuned by an amount corresponding to the receiver's intermediate frequency. The intermediate frequency is approximately 44.50 mc. in current day television receivers, although any other suitable intermediate frequency may be used.

The radiated local oscillator signal from the television receiver is modulated by the scanning frequency $f_s$ of the receiver's line frequency generator. This frequency is nominally 15,750 c.p.s. although any other suitable frequency may be used. This modulation may be either amplitude or frequency in nature, or a combination of both and it appears as two sideband components at frequencies $f_o+f_s$ and $f_o-f_s$. Where a 15,750 c.p.s. line scanning frequency is used, the sidebands appear at frequencies $f_o+15{,}750$ c.p.s. and $f_o-15{,}750$ c.p.s.

FIGURE 2 shows one embodiment of a monitoring unit for detecting received radiated local oscillator signals and identifying these as originating from a television receiver where the radiated local oscillator signals are amplitude modulated by the line scanning signals of the receiver. The radiated composite modulated local oscillator signal is received by an antenna 10 of conventional construction. If desired, the antenna 10 may be of the parabolic or other directional type and movable so that local oscillator radiations from individual receivers located in houses or apartments can be picked up separately.

The composite modulated local oscillator signal received by antenna 10 is applied to the input of a radio frequency amplifier 12 which is also of conventional construction. Where a single monitoring unit is to monitor all channels, amplifier 12 preferably has sufficient bandwidth to pass the entire range of frequencies radiated by the local oscillator as it is tuned through the VHF and the UHF television bands. If desired, two separate radio frequency amplifiers may be used for the VHF and UHF bands. Where the monitoring unit is to monitor only a single channel the amplifier 12 need only have a bandwidth adequate to perform the task.

The output of the radio frequency amplifier 12 is applied to one input of a mixer 14 whose other input is the signal from a local oscillator 16 of the monitoring apparatus. The frequency of the output signal of local oscillator 16 is swept over a desired range, say for example the range needed to sweep completely over one television channel of six megacycle bandwidth, or the narrower range over which the local oscillator radiation signals occur, which is usually about two megacycles. This can be done by manual means or by the voltage output of a sweep voltage generator 18. Oscillator 16 is preferably voltage responsive to sweep over its range in response to a sawtooth output signal from a generator 18. The local oscillator 16 may have components to be switched into its circuit to produce the proper frequency signals for the mixer when it is desired to use the same monitoring unit to scan more than one television channel. Preferably, where more than one channel is received in any separate given area being monitored, a monitoring unit such as being described in FIGURE 2 is provided for each such channel. The plurality of units would be fed from the common antenna 10 and each unit's radio frequency amplifier 12 would be tuned only to a particular channel. This would permit simultaneous monitoring of all channels in an area. In general, only a few television channels are recived in most areas so that only a correspondingly few monitoring units would be needed.

The output of mixer 14, which is the intermediate frequency $f_{if}$ of the monitoring unit, is applied to an intermediate frequency amplifier 20. The amplifier is constructed to pass the intermediate frequency signal which will contain information of $f_o$ and its two sidebands $f_o \pm f_s$. This can be done in any of a number of ways. For example, an amplifier whose bandwidth encompasses the frequency range from $f_{if}-f_s$ to $f_{if}+f_s$ is connected to the mixer 14. The output of this amplifier would include three crystal filters which are sharply tuned to the respective frequencies $f_{if}-f_s$, $f_{if}$ and $f_{if}+f_s$. As a local oscillator signal is received by the monitoring unit, the signals $f_{if}$ and its sidebands $f_{if} \pm f_s$ will be produced. The sidebands contain the line scanning frequency modulation information. If desired, the amplifier may be placed after the filters rather than before them. It shound be understood that any other suitable arrangement may be used for separating the received local oscillator signal and its sidebands.

The output signal of amplifier 20 varies in time as the local oscillator 16 is swept in accordance with the frequencies of the different radiated local oscillator signals being received by the antenna 10. This is conventional in a panoramic receiver of the type being described. As explained previously, the radiated local oscillator frequencies of individual television receivers differ slightly. This fact coupled with a directional antenna permits monitoring of the receivers in individual locations.

The output of amplifier 20 is applied to the input of a conventional amplitude detector circuit 22 whose output is the modulating information contained in the intermediate frequency signal. This modulating information is the amplitude of the individual receiver's radiated local frequency signal $f_o$ as well as the upper and lower sidebands $f_o \pm f_s$ produced by the modulating line scanning frequency signal. The sideband information will be of considerably lesser amplitude than the local oscillator signal.

The output of detector 22 is applied through a switch 23 to one vertical deflection plate of a conventional cathode ray tube display 24 whose horizontal time base is produced by the sawtooth sweep voltage from generator 18 applied to a horizontal deflection element of the tube. The tube 24 will display the signals produced at the output of detector 22. Since the sideband signals corresponding to the line scanning frequency are of considerably less amplitude than the local oscillator signals, these may be readily eliminated from the display by a suitable clipper circuit (not shown) is desired.

The reception of local oscillator radiations or other signals in the frequency range of $f_o$ swept by the monitoring unit would be indicated on the cathode ray tube 24. However, these signals could not be definitely identified as originating from a television receiver. To identify the received signals as originating from a television receiver, the output of detector 22 is also connected to the input of a bandpass amplifier 30 which is tuned to the television receiver line scanning frequency, for example 15,750 cycles per second. This is the frequency of the AM information contained in the sidebands of the radiated local oscillator signal. Amplifier 30 is of conventional construction and preferably has a relatively high gain. An oscillator which is locked to the incoming 15,750 signals and operates to produce an output only on receipt thereof, may also be used to produce a sine wave output, if desired.

The output of tuned amplifier 30 is applied to one input of a phase sensitive detector 32 whose other input is substantially sine wave type signals of the line scanning frequency applied from a generator 34 through a phase shifter 36. The generator 34 is synchronized from the main power line (normal frequency 60 c.p.s.) and is any suitable combination of multipliers and dividers for stepping the 60 c.p.s. line frequency up to the line frequency of 15,750 c.p.s. Such circuits are conventional in the art, for example, as shown in "Television," 2d Edition by Zworykin and Morton, Wiley, 1954, page 940.

It should be understood that there are several other ways of producing the 15,750 reference signal. One of these is by using a stable oscillator 44 such as of the crystal controlled type. This oscillator is connected to the input of the phase shifter 36 by a three-position switch 45. Another source for the reference signals would be from a 15,750 oscillator 46 which is locked in frequency and phase to the synchronizing signals of the same channel which is being surveyed. The locking signal is from a source 47 which derives them from the horizontal sync pulses produced by the sync separator (not shown) of another television receiver in the monitoring station which is tuned to the channel being monitored. In this case, the phase of the received signal should be the same as the phase of the signal being monitored, so that the phase shifter 36 is not needed. Therefore, the signals are applied directly to the detector 32 through a three-position switch 49, and the switch 45 would be in the "off" position. If needed, the phase shifter 32 can be used for the signals from locked oscillator 46. If the signals from crystal oscillator 44 are of the proper phase, then the phase shifter 32 need not be used.

Phase shifter 36 may either be of the manually or electrically variable type. Only one setting of the phase shifter 36 is usually needed for a particular television channel being monitored since the local oscillator radiations from all receivers tuned to this channel would all be modulated with line scanning signals which are synchronized to the signal from the television transmitter. The transmitter, in turn, is synchronized to the power source or a crystal controlled oscillator which usually is operated at twice the line scanning frequency, i.e., 31,000 c.p.s.

The phase sensitive detector 32 produces an output signal when the AM sideband signals from the tuned amplifier 30 and the locally generated signals from phase shifter 36 are in phase. A simple phase sensitive detector for performing this function is described in "Microwave Spectroscopy" by Townes & Schawlow, McGraw-Hill, 1955, page 422. An output from the phase detector would indicate that the signal being received by the monitoring unit originates from a particular channel as received by a television receiver as uniquely distinguished from any other type of signal source.

The output of phase sensitive detector 32 is applied to an indicator 40 which is used to produce an indication of this output. Indicator 40 may be any suitable device, for example a meter, cathode ray oscilloscope, recorder, counter, etc. In the latter case, where a counter is used, the voltage output of the phase sensitive detector would be used to open and/or close the contact of a relay by connecting the detector output to the relay coil. A suitable amplifier may be used, if needed. The tally of the counter would show the number of television receivers tuned to a particular channel, with no errors being introduced into the tally by signals from other sources of approximately the same frequency as the television receiver dradiated local oscillator signal.

While the system of FIGURE 1 uses a phase detector 32 to compare the received line scanning frequency energy modulating information with a locally generated signal of the same frequency, it should be understood that this arrangement is not always necessary. For example, it might be desirable in some cases, to use the 15,750 c.p.s. signal at the output of amplifier 30 to directly operate the indicating device 40.

FIGURE 3 shows another embodiment of the invention, for identifying received signals of local oscillator frequency as originating from a television receiver when the local oscillator signal is frequency modulated by line scanning frequency energy. In FIGURE 3, similar reference numerals are utilized for the same components shown in FIGURE 2.

The signal received by antenna 10 is applied to the input of radio frequency amplifier 12. The output of amplifier 12 is applied to one input of the mixer 14 whose other input is the signal from local oscillator 16 which is swept in frequency in accordance with the output voltage of the sweep voltage generator 18. The output of mixed 14 is applied to the input of the intermediate frequency amplifier 20. The bandwidth of amplifier 20 is made wide enough to accommodate the local oscillator frequency and the sidebands containing the 15,750 c.p.s. signals which frequency modulate it. As before, the output of the intermediate frequency amplifier 20 contains the received local oscillator signal frequency modulated by the sidebands produced by the energy of the line scanning circuits in the television receiver. The local oscillator signal and the sideband components are separated by a suitable filter circuit, such as the one described before.

The output of the amplifier 20 is applied to suitable circuits for recovering the original modulating information, i.e. the local oscillator signal and the sidebands. These circuits comprise a limiter 50 of conventional construction and a suitable discriminator circuit 52, also of conventional construction.

The output of discriminator circuit 52 will be the original local oscillator signal. This may be displayed on a suitable device such as a cathode ray tube, if desired. The sideband information produced by the line scanning frequency energy, which now appears as an amplitude modulated signal, is again applied to the tune 15,750 c.p.s. amplifier 30. The remainder of the system operates in the same manner as that described in FIGURE 2. Namely, the output of amplifier 30 is applied to one input of the phase sensitive detector 32, whose other input is the locally generated 15,750 c.p.s. signals produced by generator 34 and applied through phase shifter 36. The indicator 40 is actuated when detector 32 produces an output signal.

It should be understood that the amplitude modulated signal detecting portions of the system of FIGURE 2, i.e. the bandpass amplifier 20 and the amplitude detector 22, and the frequency modulated signal detecting components of the system of FIGURE 3, i.e. limiters 50 and discriminator 52 may be combined in a single monitoring unit with common receiving and signal indicating components. Thus, where it is unknown whether the received local oscillator signal is amplitude or frequency modulated by the line scanning energy, the signal detecting portions can be switched back and forth to detect both types of modulation.

Where the signal levels of the received local oscillator signals are low, it may be desirable to apply suitable signal correlation techniques, i.e., replaying a received signal by means of a suitable storage medium to separate the useful signal components from the surrounding noise These techniques are well known in the art and no further description is needed.

It can therefore be seen that a novel system has been provided for taking a survey of the number of television receivers which are tuned to a particular channel. The system has particularly useful features in that the received signals can be uniquely identified as originating from a television receiver by means of the modulation produced by the receiver's line scanning frequency circuits. Thus, a source of error is eliminated from the final count of signal received.

While a preferred embodiment of the invention has been described above it will be understood that this embodiment is illustrative only and the invention is to be limited solely by the appended claims.

What is claimed is:

1. A system for surveying the station to which an individual television receiver is tuned in which a said receiver radiates a radio frequency signal from its local oscillator of a frequency corresponding to the station being received which radiated local oscillator signal cathode ray tube deflection produced by said receiver, said survey system comprising:

means for receiving said modulated radiated local oscillator radio frequency signal corresponding to and thereby identifying the station to which the receiver being monitored is tuned, means connected to said receiving means for demodulating the deflection scanning signal information from said received local oscillator radio frequency signal, and indicating means connected to said demodulating means and responsive to said demodulated deflection scanning signal information for identifying the reception of a radiated local oscillator radio frequency signal as originating from a television receiver.

2. A system as set forth in claim 1 wherein the deflection scanning signal energy is the line scanning signals which amplitude modulate the radiated local oscillator signal and said demodulating means comprises an amplitude detector.

3. A system as set forth in claim 1 wherein the deflection scanning signal energy is the line scanning signals which frequency modulate the radiated local oscillator signal and said demodulating means comprises a frequency modulation detection system.

4. A system for surveying the station to which an individual television receiver is tuned in which a said receiver radiates a radio frequency signal from its local oscillator of a frequency corresponding to the station being received which radiated local oscillator signal is modulated by the energy of the cathode ray tube deflection line scanning signals produced by said receiver, said survey system comprising:

means for receiving said modulated radiated local oscillator radio frequency signal corresponding to and thereby identifying the station to which the receiver being monitored is tuned, means connected to said receiving means for demodulating the line scanning signal information from said received local oscillator radio frequency signal, means for locally generating a signal of the same frequency as said line scanning signals, means electrically coupled to said demodulating means and to said generating means for comparing the locally generated signal with the demodulated line scanning signal information, and means electrically connected to said comparing means for producing an indication when the two signals being compared have a common characteristic.

5. A system as set forth in claim 4 wherein a phase shifter means is electrically connected between said local signal generating means and said comparing means to adjust the phase of the locally generated signal applied to said comparing means.

6. A system for surveying the stations to which individual television receivers are tuned in which each said television receiver radiates a radio frequency signal from its local oscillator of a frequency corresponding to the station being received which radiated local oscillator signal is modulated by the energy of the line scanning signals produced by each said receiver, said survey system comprising:

means for receiving radiated local oscillator radio frequency signals from the various television receivers and radiated radio frequency signals from other sources, the frequency of an individual received signal radiated by a television receiver identifying the station to which the receiver is tuned, means for sequentially analyzing the received radio frequency signals as a function of frequency, means connected to said analyzing means for demodulating line scanning signal information from a received local oscillator radio frequency signal radiated from a television receiver being monitored, and indicating means connected to said demodulating means and responsive to said demodulated line scanning signal information for identifying a received radio frequency signal as originating from a television receiver.

7. A system as set forth in claim 6 wherein the line scanning signal energy amplitude modulates the radiated local oscillator signal and said demodulating means comprises an amplitude detector.

8. A system as set forth in claim 6 wherein the line scanning signal energy frequency modulates the radiated local oscillator signal and said demodulating means comprises a frequency modulation detection system.

9. A system for surveying the stations to which individual television receivers are tuned in which each said television receiver radiates a radio frequency signal from its local oscillator of a frequency corresponding to the station being received which radiated local oscillator signal is modulated by the energy of the line scanning signals produced by each said receiver, said survey system comprising:

means for receiving radiated local oscillator radio frequency signals from the various television receivers and signals from other sources, the frequency of a received signal radiated by a television signal identifying the station to which the receiver is tuned, means for sequentially analyzing the received radio frequency signals as a function of frequency, means connected to said analyzing means for demodulating line scanning signal information from a received local oscillator radio frequency signal radiated from a television receiver being monitored, means for locally generating a signal of the same frequency as said line scanning signals, means electrically connected to said demodulating means and said generating means for comparing the locally generated signal with the demodulated line scanning signal information, and means electrically connected to said comparing means for producing an indication when the two signals being compared have a common characteristic.

10. A system as set forth in claim 9 wherein a phase shifter means is interposed between said local signal generating means and said comparing means to adjust the phase of the locally generated signal applied to said comparing means.

References Cited by the Examiner

UNITED STATES PATENTS 2,903,508 9/1959 Hathaway ---------- 325—31 X

DAVID G. REDINBAUGH, *Primary Examiner.*

JOHN W. CALDWELL, *Examiner.*

UNITED STATES PATENT OFFICE

CERTIFICATE OF CORRECTION

Patent No. 3,312,900 April 4, 1967

David Lawrence Jaffe

It is hereby certified that error appears in the above numbered patent requiring correction and that the said Letters Patent should read as corrected below.

Column 2, line 28, for "moduation" read -- modulation --; column 4, line 35, for "shound" read -- should --; column 7, lines 21 and 22, strike out "being received which radiated local oscillator signal cathode ray tube deflection produced by said receiver, said" and insert instead -- being received which radiated local oscillator signal is modulated by the energy of cathode ray tube deflection scanning signals produced by said receiver, said --.

Signed and sealed this 7th day of November 1967.

(SEAL)
Attest:

EDWARD M.FLETCHER,JR.
Attesting Officer

EDWARD J. BRENNER
Commissioner of Patents